United States Patent

Wisen et al.

[11] Patent Number: 5,225,217
[45] Date of Patent: Jul. 6, 1993

[54] SHUT-OFF NOZZLE FOR INJECTION MOLDING MACHINE

[75] Inventors: Gregory L. Wisen, Jackson Center; George W. Chudyk, Sidney, both of Ohio

[73] Assignee: EMI Corp., Jackson Center, Ohio

[21] Appl. No.: 767,210

[22] Filed: Sep. 30, 1991

[51] Int. Cl.⁵ .............................................. B29C 45/23
[52] U.S. Cl. ................................ 425/562; 264/328.9; 425/564
[58] Field of Search ............... 425/562, 563, 564, 565, 425/566, 568; 264/328.9

[56] References Cited

U.S. PATENT DOCUMENTS

| | | | |
|---|---|---|---|
| 4,082,226 | 4/1978 | Appleman et al. | 425/564 |
| 4,427,361 | 1/1984 | Saito | 425/563 |
| 5,030,076 | 7/1991 | Ebenhofer et al. | 425/564 |

OTHER PUBLICATIONS

The EMI "Performer" Shut-Off Nozzle Brochure, Jun. 1991.

Primary Examiner—Tim Heitbrink
Attorney, Agent, or Firm—Renner, Otto, Boisselle & Sklar

[57] ABSTRACT

A shut-off nozzle assembly for injection molding machines includes a nozzle body with high pressure flat face male-female rear and front flange connections connecting the nozzle body to a machine adaptor and a nozzle tip or nozzle tip extension, respectively. The shut-off includes a reciprocating valve pin moved by a pair of diametrically arranged exterior actuators mounted on a two-part mounting plate secured to the interior of the rear flange. The actuators drive the pin through a pair of actuator arms extending through a transverse slot in the nozzle body. The machine adaptor and body include four angled and paired passages forming a resin flow path bypassing the pin and slot with adequate wall thickness. The passages in the nozzle body are less steeply angled and are provided with an elliptical bell mouth at the flange connection flat face joining the more sharply angled passages in the machine adaptor. The passage arrangement and the male-female flat face flange connections enable the shut-off to be operated efficiently and effectively at very high pressures.

29 Claims, 4 Drawing Sheets

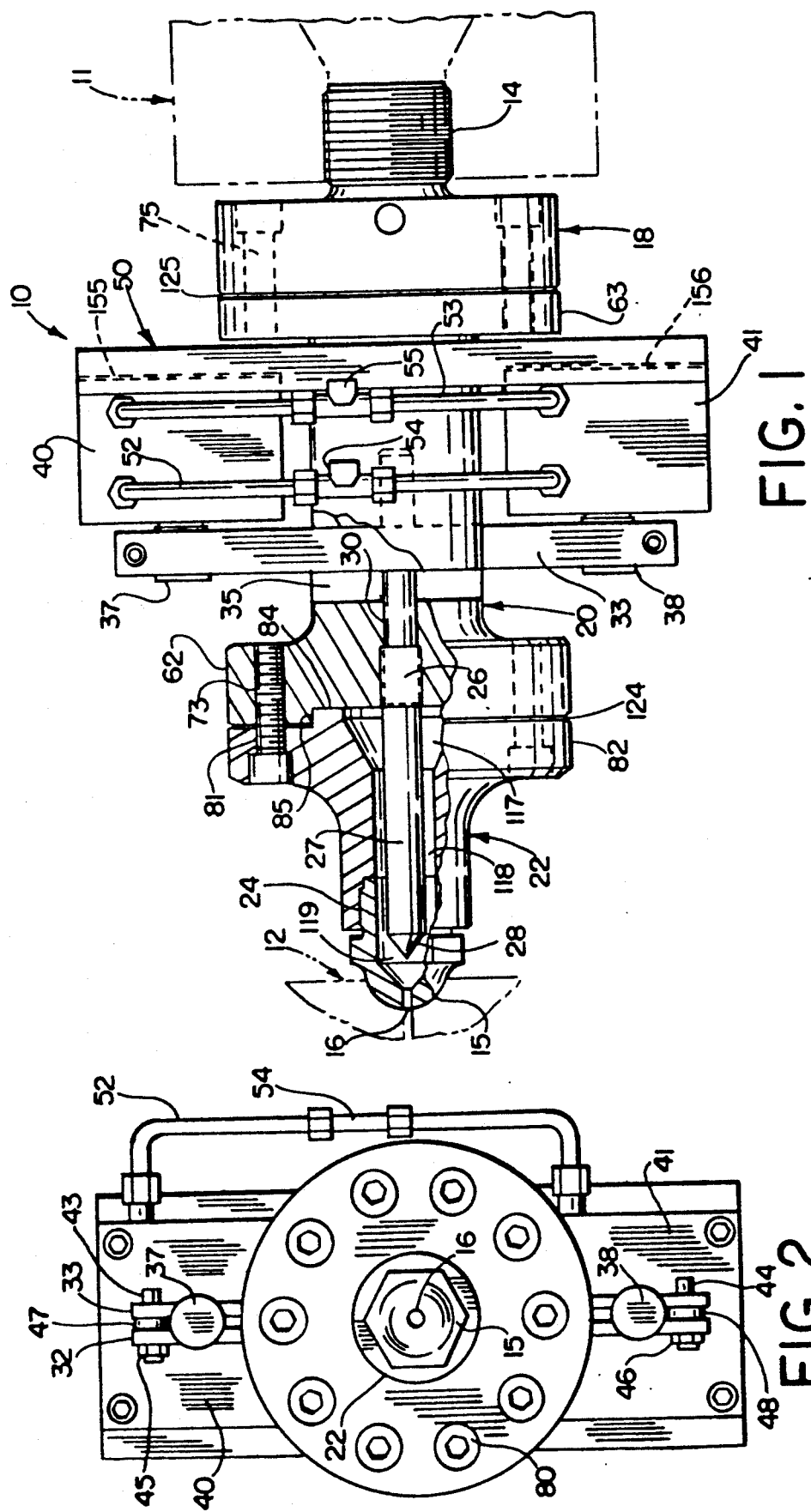

SHUT-OFF NOZZLE FOR INJECTION MOLDING MACHINE

DISCLOSURE

This invention relates as indicated to a shut-off nozzle for an injection molding machine and more particularly to an economical and efficient shut-off for machines operating at high pressures.

BACKGROUND OF THE INVENTION

Shut-off nozzles have long been employed in injection molding machines to prevent "drool" and the problems associated therewith, to shorten the cycle time, and for a number of other advantages. The present invention relates to certain improvements in shut-off nozzles for injection molding machines such as those described in prior U.S. Pat. No. 4,082,226, and sold by EMI Plastics Equipment Corp. of Jackson Center, Ohio, under the trademark PERFORMER TM. These shut-offs utilize an axially movable pin which shuts off right at the nozzle tip.

The movable shut-off pin is reciprocated by a fairly large pancake piston-cylinder assembly as shown in the patent, or by a pair of smaller pneumatic cylinder assemblies arranged diametrically of the pin. In either case the axially reciprocating pin is moved within a nozzle body by actuator arms which pass through a diametral slot in the nozzle body. Passages for the plastic melt or shot are provided around and parallel to the pin. These passages extend from diametrically enlarged chambers at each end of the nozzle body where the male-female threaded connection is provided to the nozzle tip or tip extrusion, or the machine adaptor. Such shut-offs perform effectively for most standard injection molding machines which operate at below 20,000 psi. However, some newer machines operate at pressures ranging from 30,000 to about 43,000 psi or more. At such pressures, with the usual threaded connection, the high internal pressure creates leak problems, particularly at the diametrically enlarged chambers which provide enlarged surface areas upon which the increased pressure acts.

It has also been discovered that abrupt changes in the flow path cross section tend to create a problem which is termed resin burn. Resin burn creates carbon which tends to flow into the part being molded which in turn could create a faulty part. Such carbon may have a tendency to build up plugging or partially plugging smaller openings such as the nozzle tip orifice or many parts of the mold runner system.

Accordingly, to provide an effective shut-off nozzle at such extremely high pressures it is important to avoid a conventional male-female threaded connection such as a pipe thread between the machine adaptor and the nozzle body, and also between the nozzle body and nozzle tip or tip extension. It is also important to avoid large surface areas in the resin flow path, particularly between the machine adaptor and the nozzle body. It is also important to avoid abrupt changes in flow path cross section, particularly from the machine adaptor to the nozzle body.

SUMMARY OF THE INVENTION

A shut-off nozzle for an injection molding machine includes an elongated nozzle body which is connected at one end to a machine adaptor and at the opposite end to a nozzle tip or tip extension by large male-female flange connections. The components are held together axially with male-female mating planer faces precisely abutting and clamped by a ring of threaded bolts or fasteners connecting the opposed flanges. The resin flow path from the reciprocating screw of the machine enters the machine adaptor in a central axial passage which terminates in a rounded end and from which extend four sharply angled passages of approximately half the diameter of the central passage. The angle passages exit through the circular flat female face of the flanged end of the machine adaptor forming elliptical exit openings at the flat face. The angled passages are paired so that the two passages of each pair are fairly close together or about 20° apart but each pair is diametrically and symmetrically opposed to the other pair.

The elliptical exit openings in the flat female face of the machine adaptor mate with less steeply but oppositely angled passages in the longer shut-off body. The entry end of such passages at the male flat face of the body-adaptor flange connection is elliptically bell mouthed to provide an abutment free transition at the flange flat-face connection. The less steeply and oppositely angled longer passages in the nozzle body bypass the pin and pin bushing recess, as well as the transverse actuator arm slot, all in the forward part of the nozzle body and exit through the flat female face of the body-nozzle or nozzle tip extension flange connection, all with sufficient wall thickness clearances. The nozzle or nozzle tip extension in which the pin reciprocates includes a male flat face and a flanged connection to be tightly secured to the front end of the nozzle body. The flanged connections at each end of the nozzle body each includes a ring of threaded fasteners which, when uniformly and properly torqued, hold the flat male and female faces in tight fit to withstand the noted extreme pressures.

To assure that the paired oppositely angled passages in the nozzle body and machine adaptor are aligned internally, a special alignment key and keyways are employed with the flanges of that connection. Also, because of the flange connections at each end of the nozzle body, the mounting plate for the paired valve pin actuators, one on each side of the nozzle body, is made in two symmetrical parts which are bolted to the interior of the flange at the nozzle body-machine adaptor connection. The assembled mounting plate forms recesses for mica-plate insulators to protect the actuators from the heat of the injection molding process.

With the present invention an easily constructed and assembled, yet low cost shut-off nozzle is provided which will operate effectively at high pressures.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a side elevation partially broken away and in section of a shut-off nozzle in accordance with the present invention;

FIG. 2 is an axial tip or front end elevation as seen from the left hand side of FIG. 1;

DETAILED DESCRIPTION OF THE PREFERRED EMBODIMENTS

Figure 3:
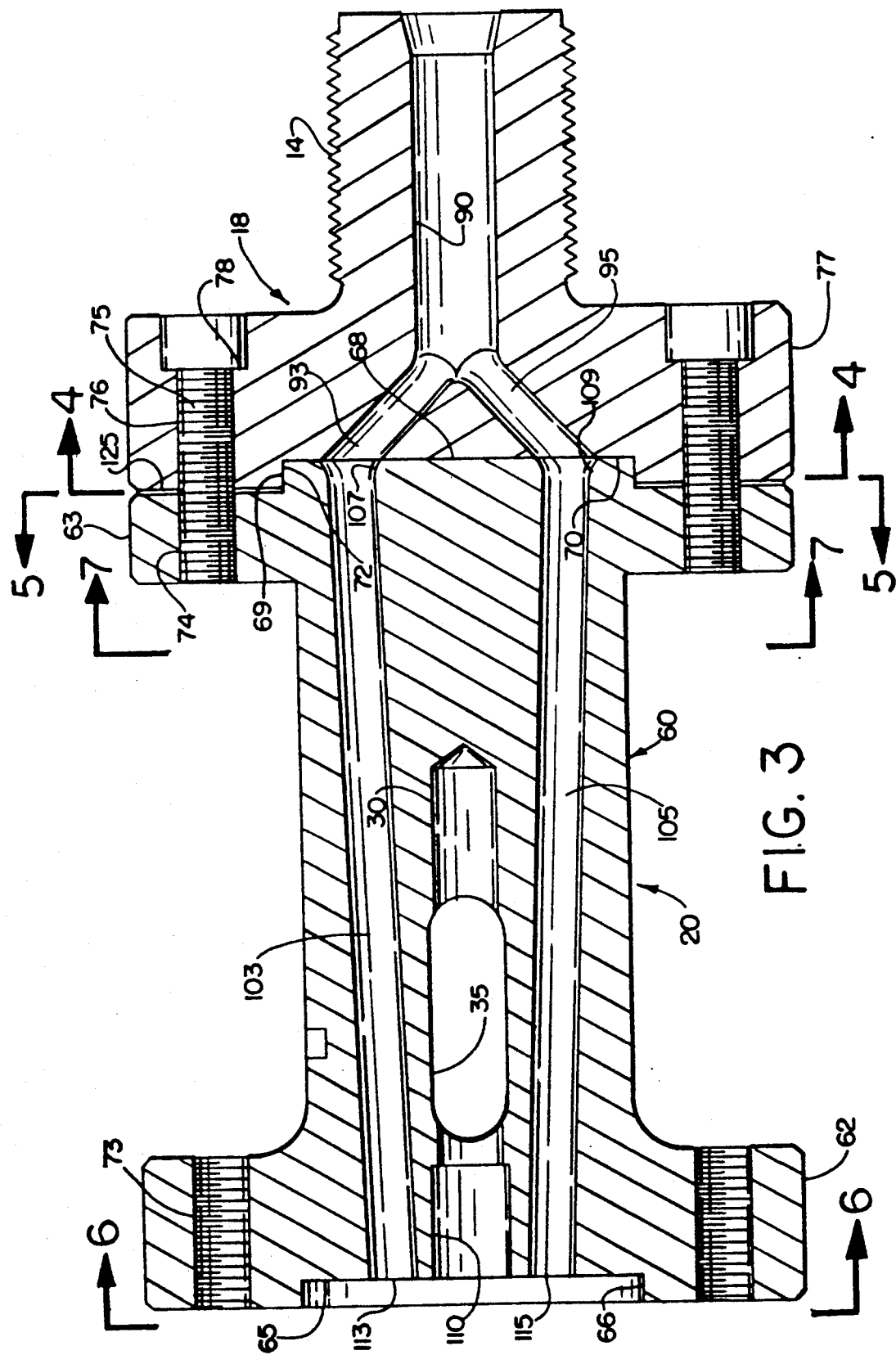
FIG. 3 is an enlarged longitudinal section through the connected nozzle body and machine adaptor illustrating the angled intersecting resin flow paths in each, as well as the flanged connection between the two parts.

Referring now to the drawings and more particularly to FIGS. 1 and 2, there is illustrated generally at 10 a shut-off nozzle in accordance with the present invention. One end of the shut-off nozzle is secured to the exit end of a reciprocating screw injection molding machine as shown in phantom lines at 11 while the opposite end or nozzle tip abuts against the mold shown also in phantom lines at 12.

The shut-off is connected to the outlet of the injection molding machine by the threaded connection 14. The opposite end of the shut-off includes the rounded nozzle tip 15 having relatively small resin orifice 16 in communication with the runner system of the mold.

The components of the shut-off include a machine adaptor 18, a nozzle body 20 and a nozzle tip extension 22, to which the nozzle tip 15 is secured by the threaded connection seen at 24. In some forms of the shut-off the nozzle tip and nozzle tip extension may be one unit.

Axially slidably mounted in bushing 26 is a valve member or pin 27 which includes a conical tip 28 adapted in its extended position to bear against the interior of the orifice 16 of the nozzle tip, shutting off resin flow at the nozzle tip. The valve pin 27 reciprocates axially in axial recess 30 in the nozzle body 20 and is driven for such axial reciprocation by a pair of actuator arms 32 and 33 which extend transversely through slot 35 in the nozzle body. The actuator arms are captured by transverse flats in the pin and are also similarly captured by flats in rod extensions 37 and 38 of piston-cylinder assemblies 40 and 41, respectively.

The actuator arms are connected at each end by fasteners 43 and 44 threaded into lock nuts 45 and 46. The fasteners also extend through spacers seen at 47 and 48 which maintain the parallelism of the actuating arms to prevent bowing or binding as the fasteners are tightened.

The piston-cylinder assemblies are mounted on a two-part mounting plate seen generally at 50 which is secured to the nozzle body as hereinafter described. The piston-cylinder assemblies are provided with spanning tubing indicated at 52 and 53, each of which includes a Tee connector as seen at 54 and 55, respectively, to which fluid supply lines may be connected.

Referring now additionally to FIG. 3 it will be seen that the nozzle body includes an elongated cylindrical midsection 60 and has radially projecting front and rear connecting annular flanges 62 and 63. The front face of the nozzle body includes a recessed or female circular flat face 65. The recess forms an annular shoulder 66.

The rear of the nozzle body includes an annular projecting flat face 68 formed by an annular shoulder 69. The projecting or male flat face 68 is designed to mate with a female or recessed flat face 70 formed in the front end of the machine adaptor 18. The recessed or female flat face in the machine adaptor is bounded by cylindrical shoulder 72 into which the shoulder 69 closely telescopes.

The front flange is provided with a ring of equally spaced threaded holes indicated at 73; ten in number, in the illustrated embodiment. The rear flange is also provided with threaded holes 74. As seen in FIG. 3 these holes 74 receive socket head cap screws or shouldered bolts indicated at 75 which extend into shouldered non-threaded holes 76 in the forward thick flange portion 77 of the machine adaptor. The heads of the cap screws seat in the shoulders of the holes as they are tightened as indicated at 78.

Reverting back to FIG. 1 it will be seen that the nozzle tip extension 22 is held to the front flange 62 of the nozzle body by ten similar cap screws or bolts extending through shouldered holes 81 in the rear flange portion 82 of the nozzle extension and threaded into the tapped holes 73 in the nozzle body front flange 62. It can also be seen from FIG. 1 that the rear of the nozzle tip extension includes an annular male flat face 84 terminating exteriorly in an annular shoulder 85, such flat face and shoulder telescoping within the recessed or female flat face 65 and shoulder 66 at the front of the nozzle body.

The resin flow path from the typical reciprocating screw injection molding machine 11 enters the shut-off through axial bore 90 in machine adaptor 18. At the approximate axial midpoint of the relatively thick flange portion 77 the bore 90 divides into four smaller passages 92, 93, 94 and 95 which are relatively steeply angularly related to the axis of bore 90 and the axis of the shut-off. As can be seen more clearly in FIG. 4 the smaller passages are paired and symmetrically arranged on opposite sides of a diameter of the shut-off. As will become apparent, the diameter of the shut-off coincides with the transverse slot 35 for the valve nozzle pin actuating arms. It is also apparent from FIG. 4 that the axes of the passages 92-95 are laterally offset from the axis of the bore 90 with the diameter of such passages being approximately equal to the radius of the larger bore 90. Accordingly each of the four passages has a cross-sectional area which is approximately one-fourth of the cross-sectional area of the bore 90.

In the illustrated embodiment, the passages 92-95 extend at about 45° to the axis of the bore and intersect the flat face 70 forming elliptical openings seen at 96, 97, 98 and 99 for the respective passages.

Figure 6:
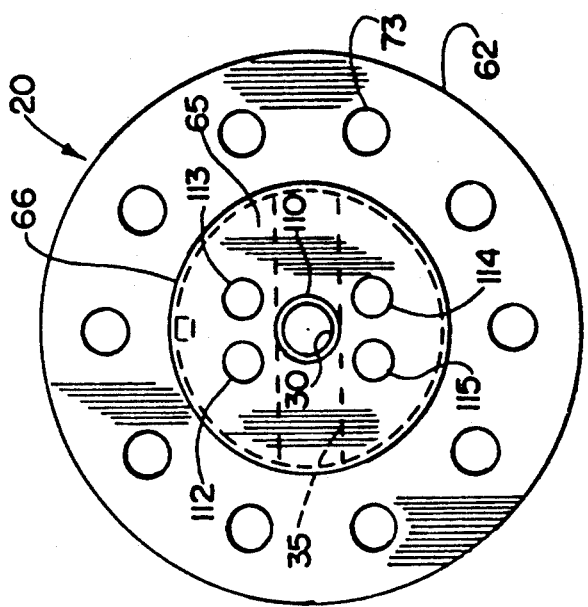
FIG. 6 is a similar view of the front female flange connection face at the nozzle tip or nozzle tip extension connection as seen from the line 6—6 of FIG. 3.
Figure 5:
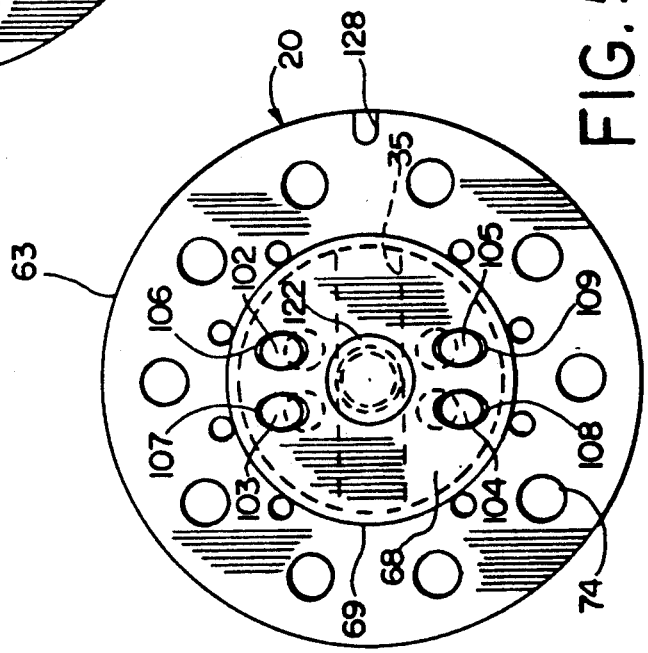
FIG. 5 is a similar view of the mating wall flange connection face of the nozzle body as seen from the line 5—5 of FIG. 3.

Referring now additionally to FIGS. 5 and 6 it will be seen that the rather sharply angled paired passages 92-95 communicate with less sharply and oppositely angled passages 102-105, respectively, in the nozzle body 20. Because of the difference in angle as apparent in FIG. 3, the openings of the passages 102-105 at the flat face 68 are provided with elliptical enlargements or elliptical bell mouths as seen at 106, 107, 108 and 109. In this manner the openings of the passages in the nozzle body at the male flat face 68 correspond to the openings of the passages in the machine adaptor at the female flat face 70.

As seen in FIGS. 3 and 6 the linear slightly angled passages 102-105 bypass the central recess 30 for the valve pin 27, the transverse slot 35 for the actuator arms 32 and 33, and the slightly enlarged recess 110 for the pin bushing 26. Such passages exit through female flat face 65 at the openings 112 through 115, respectively. These openings are radially within the annular male flat face 84 of the nozzle tip extension. Such passages communicate with the conical chamber 117 in the nozzle tip extension. From there the resin flows around the pin 27 through annular passage 118 and into the nozzle tip chamber 119 to exit the orifice 16.

It is noted in FIG. 5 that the center of the flat face 68 of the rear end of the nozzle body may be provided with a circular very shallow recess indicated at 122. The recess simply concentrates the clamping pressure obtained by the proper torquing of the flange fasteners to the annular area between the recess and the shoulder 69, which area includes the intersecting angle passages. It is also noted that in the fully clamped condition of the shut-off nozzle there is a slight clearance between the flanges 82 and 62 at the front of the nozzle body as indicated at 124. Similarly there is a slight clearance between the flanges 63 and 77 at the rear of the nozzle body as indicated at 125. In this manner all of the clamping pressure is concentrated at the flat bearing faces of the male-female flange connections.

Figure 4:
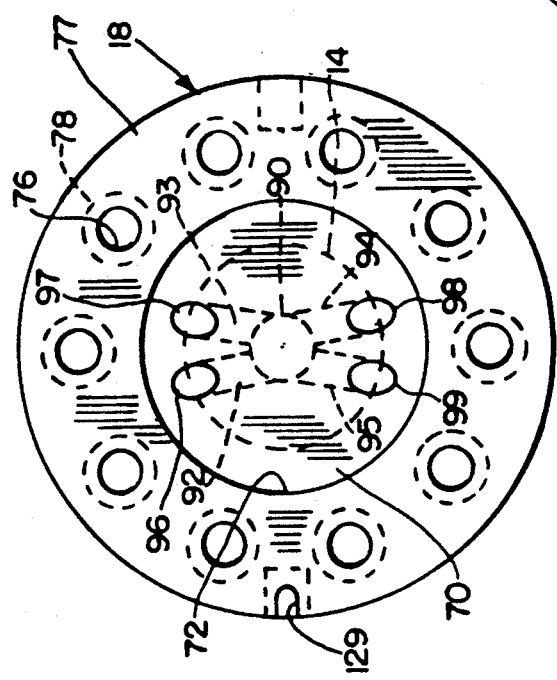
FIG. 4 is an axial view on a reduced scale of the female flange connection face of the machine adaptor as seen from the line 4—4 of FIG. 3.

As seen in FIGS. 4 and 5, in order properly to assemble the nozzle body and machine adaptor to make sure that the paired internal resin passages are properly lined up, the rear flange 63 of the nozzle body is provided with a radially extending keyway 128. A similar keyway is provided in the flange portion 77 of the machine adaptor as seen at 129 in FIG. 4. When the keyways are lined up and a key inserted, the internal passages are properly aligned.

Figure 7:
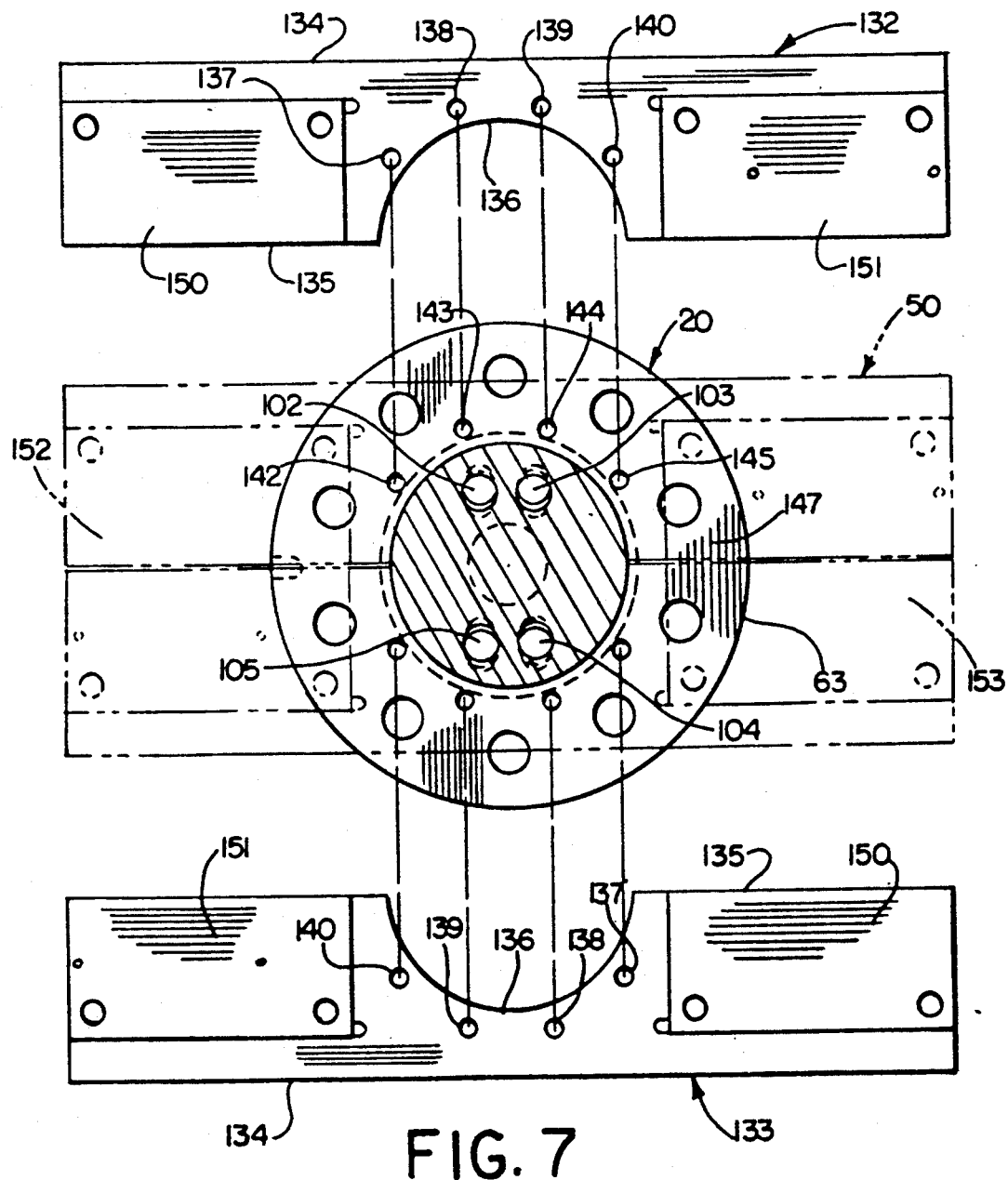
FIG. 7 is a section taken from the line 7—7 of FIG. 3 illustrating how the two part actuator mounting plate is assembled and attached to the inside of the rear flange of the nozzle body.

Referring now to FIG. 7 it will be seen that because of the front and rear flanges on the nozzle body, the mounting plate 50 for supporting the actuators 40 and 41 is formed of two parts indicated at 132 and 133. The two parts are identical. Each part includes an outer linear edge 134 and a center or inner edge 135 which includes at the center thereof a semicircular recess 136. Four circularly arranged holes indicated at 137, 138, 139 and 140 are provided around the recess. These holes may be aligned with tapped holes 142, 143, 144 and 145 which are provided on the inner face 147 of the rear flange 63 of the nozzle body 20. In this manner, each half of the mounting plate 50 may be secured to the interior face of the rear connecting flange of the nozzle body by means of four fasteners such as socket head cap screws inserted through the respective holes and threaded into the tapped holes in the rear flange. Each half of the mounting plate includes recesses as seen at 150 and 151 which are in the form of half a square. When the mounting plates are assembled, a square recess is formed as indicated at 152 and 153 diametrically on each side of the nozzle body. Mica insulation sheets seen at 155 and 156 in FIG. 1 provide adequate insulation for the piston-cylinder assemblies 40 and 41, also mounted in the recesses.

It can now be seen that there is provided an improved shut-off nozzle especially suited for operation with high pressure injection molding machines.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A nozzle shut-off for an injection molding machine comprising a nozzle tip, a power operated internally movable valve member operative to open and close the nozzle tip, a machien adaptor attachable to the outlet of an injection molding machine, a nozzle body in which the valve member slides, passage means within said adaptor and said nozzle body for directing injected resin from said adaptor through said body around the valve member to the nozzle tip without substantially enlarging the cross-sectional area on which the pressure of the resin acts, said passage means comprising multiple channels extending from said outlet of said injection molding machine to a cavity about said nozzle tip an actuator arm for said valve member extending through a transverse slot in said nozzle body, and resin passages in said nozzle body and machine adaptor bypassing said valve member and slot.

2. A nozzle shut-off as set forth in claim 1 including high pressure flange connection at each end of said nozzle body.

3. A nozzle shut-off as set forth in claim 2 wherein said flange connections include male-female abutting flat faces.

4. A nozzle shut-off as set forth in claim 1 wherein said resin passages are four in number and air paired on opposite sides of said transverse slot.

5. A nozzle shut-off as set forth in claim 1 wherein said nozzle shut-off includes an axis and said passages extend at an angle to the axis of the shut-off.

6. A nozzle shut-off as set forth in claim 5 wherein said passages in said nozzle body extend at an acute angle front-to-rear whereby said passages are spaced radially closer to each other about said axis at the front of said nozzle body.

7. A nozzle shut-off as set forth in claim 6 wherein said passages in said machine adaptor extend at an acute angle rear-to-front whereby said passages are spaced radially closer to each other about said axis toward the rear of said machine adaptor.

8. A nozzle shut-off as set forth in claim 7 wherein the angle of said passages in said machine adaptor is greater than the angle of the passages in said nozzle body.

9. A nozzle shut-off as set forth in claim 8 including a high pressure flange connection between said nozzle body and said machine adaptor; said connection including male-female abutting flat faces, the resin passages joining and their angled axes substantially intersecting at said abutting flat face.

10. A nozzle shut-off as set forth in claim 9 wherein said resin passages in said machine adaptor intersect the flat face in an elliptical opening, said resin passages in said nozzle body including an elliptical bell mouth at such flat face to match the elliptical opening.

11. A nozzle shut-off as set forth in claim 10 including an axial bore in said machine adaptor communicating with the outlet of the machine, said angled resin passages in said machine adaptor being approximately half the diameter of said bore.

12. A shut-off nozzle for an injection molding machine comprising a nozzle body accommodating a valve pin for axial movement, and having front and rear flanges, a flanged nozzle tip secured to said front flange; and a flanged machine adaptor secured to said rear flange, and resin passages in said body and adaptor mating at male-female abutting flat faces at said rear flange connection.

13. A shut-off nozzle as set forth in claim 12 including an actuating arm for said valve pin extending through a transverse slot in said nozzle body, said resin passages in said nozzle body extending at an angle to the axis of the shut-off nozzle, to be farthest from said axis at said rear flange connection.

14. A shut-off nozzle as set forth in claim 13 including an axial bore in said machine adaptor communicating with said machine and said resin passages, said resin passages being four in number and approximately one-half the diameter of said bore.

15. A shut-off nozzle as set forth in claim 14 wherein said shut-off nozzle includes an axis and said resin passages in said machine adaptor extend at an angle to the axis of the shut-off nozzle, to be radially farthest from said axis at said rear flange connection.

16. A shut-off nozzle as set forth in claim 15 wherein the angle of said passages in said machine adaptor is greater than the angle of the passages in said nozzle body.

17. A shut-off nozzle as set forth in claim 16 wherein said resin passages in said machine adaptor intersect said abutting flat faces in an elliptical opening, the opposed resin passages in said nozzle body having elliptical bell mouth enlargements at such abutting flat faces.

18. A shut-off nozzle as set forth in claim 14 wherein said resin passages are paired, each pair on opposite sides of said transverse slot.

19. A shut-off nozzle as set forth in claim 18 including alignment keyways in said rear flange connection to assure alignment of said resin passages at said flat faces.

20. A shut-off nozzle as set forth in claim 12 including a ring of fasteners interconnecting the flanges of said flange connections.

21. A shut-off nozzle as set forth in claim 13 including a pair of actuators driving said actuator arm, said actuators being diametrically arranged and supported on a mounting plate secured to the inside face of said rear flange.

22. A shut-off nozzle as set forth in claim 21 wherein said mounting plate is formed of two parts, each having a semicircular recess adapted to clear the nozzle body.

23. A shut-off nozzle for an injection molding machine, comprising a nozzle body and a nozzle tip, a valve member movable axially in said body operative to open and close said nozzle tip, a pair of actuators mounted on the exterior of said nozzle body operative to move said valve member, a front and rear external annular connecting flange at each end of said nozzle body, a two-part mounting plate secured to an inner face of said rear flange, said plate forming two actuator seats on diametrically opposite sides of the nozzle body, and actuators mounted in said seats operative to move said valve member.

24. A nozzle as set forth in claim 23 including semicircular recesses in each mounting plate part adapted to clear the nozzle body.

25. A nozzle as set forth in claim 24 including means to fasten mounting plate parts to the rear flange adjacent the semicircular recess.

26. A nozzle as set forth in claim 25 wherein said seats are formed by mating recesses in said mounting plate parts.

27. A nozzle as set forth in claim 23 wherein each actuator includes a piston extension, actuator arms connecting said piston extensions and an axially movable valve member in said shut-off, said arms extending beyond said extensions and being interconnected at each end by a fastener extending between the ends of said arms, and a spacer between said arms, said spacer permitting the fastener to be tightened without bowing said arms.

28. A nozzle as set forth in claim 27 including a diametral slot in said nozzle body through which said arms extend, and angled paired resin passage means in said nozzle body bypassing said slot.

29. A nozzle as set forth in claim 23 wherein said front and rear flanges form high pressure connections at each end of the nozzle body.

* * * * *